No. 794,659. Patented July 11, 1905.

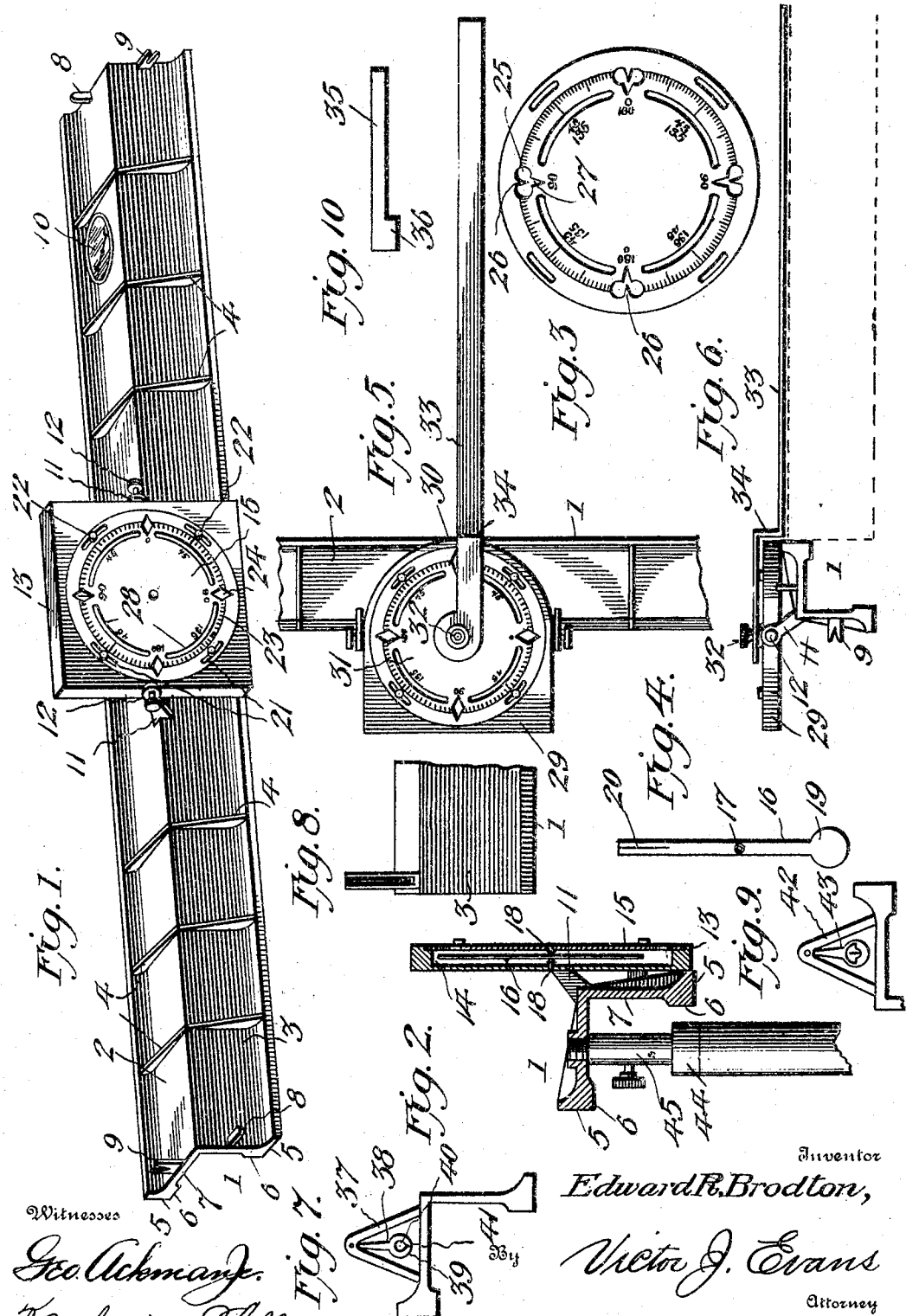

UNITED STATES PATENT OFFICE.

EDWARD R. BRODTON, OF ATLANTA, GEORGIA, ASSIGNOR OF ELEVEN-TWELFTHS TO G. W. PARROTT, E. H. THORNTON, T. D. MEADOR, D. B. CARSON, T. A. HAMMOND, T. H. EGLESTON, EDWARD M. HORINE, C. A. CONKLIN, R. E. PARK, D. U. O. ROBERTSON, H. C. STOCKDELL, AND D. G. JONES, OF ATLANTA, GEORGIA.

LEVEL AND PLUMB.

SPECIFICATION forming part of Letters Patent No. 794,659, dated July 11, 1905.

Application filed May 17, 1904. Serial No. 208,434.

*To all whom it may concern:*

Be it known that I, EDWARD R. BRODTON, a citizen of the United States, residing at Atlanta, in the county of Fulton and State of Georgia, have invented new and useful Improvements in Levels and Plumbs, of which the following is a specification.

This invention relates to combined levels and plumbs adapted for general use and applicable either to horizontal or perpendicular objects as well as inclined devices, and having means for ascertaining the exact level of a horizontal surface or a perpendicular object, and to readily determine inaccuracies in the trueness of devices tested thereby, and capable of application also to different sides or edges of joists, beams, rafters, posts, plates, or other structural parts or objects. The combined level and plumb is also especially useful in determining the correct position and pitch of gable structures, and may be applied in reverse position with respect to parts thereof disposed at angles of intersection or extending in upward direction with relation to each other, and having means which will permit an operator to readily determine a desired angle in laying off work or forming bevels or in placing a structural part in accordance with some predetermined arrangement or computation. The improved device also includes means whereby it can be used in sighting beams, sills, girders, or other similar structure members of elongated form to arrive at an accurate placement of said members and also in running lines or ditches and replace the usual surveying instruments generally employed for such purpose to facilitate finding, in an economical manner, true horizontals and the correct position of supporting devices desired to be erected on uneven surfaces or grades. In some instances the improved device may also be used in simple triangulation operations in defining or laying out inclosures or fence-lines and the like. The level and plumb embodies an angular stock with a leveling element pivotally and removably supported thereon at an intermediate point, the said element being free to be turned or adjusted against either one of two sides of the stock and having an inclosed needle or index-hand coöperating with an exterior dial-plate, which may at times be employed as a sector in conjunction with a beveling extension or for other purposes, the dial-plate having needle-exposing openings or slots therein and divided into degrees so numbered as to be readable in opposite directions to accommodate a reverse application of the combined level or plumb and also permitting a declination of the object tested either in horizontal or perpendicular position to be readily ascertained. The leveling element is also adapted for use, exclusive of the stock, in confined spaces or inclosures where it is impracticable to apply the stock carrying the leveling element, and at times the said leveling element may be used alone on surfaces to be tested or as a protractor or ordinary square. The combined level and plumb also embodies a stock which is economical in the cost of manufacture and capable of application in a variety of ways to horizontal or perpendicular surfaces or to angles in any position or to perform the functions of an inclinometer. The use of the combined level and plumb is further extended by means of an attachment coöperating with the dial of the leveling element to provide a T-square or a bevel-square. The stock also has sights and points at opposite ends in reverse position on the members thereof, which, in some instances, will be movable and automatically assume a perpendicular position with respect to each other irrespective of the degree of inclination of the members of the stock, and in conjunction with one of the members of the stock a compass coöperates and is held thereby, thus adapting the improved device for use as a transit of a simplified form.

The invention also consists in the details of construction and arrangement of the several parts, which will be more fully hereinafter set forth.

In the drawings, Figure 1 is a perspective view of a combined level and plumb embodying the features of the invention. Fig. 2 is a transverse vertical central section of the level and plumb, showing the manner of attaching a supporting device thereto. Fig. 3 is a detail front elevation of a dial-plate forming part of the leveling element. Fig. 4 is a detail elevation of an index-hand adapted to coöperate with the dial. Fig. 5 is a top plan view of a portion of the stock of the level and plumb, showing a slight change in the shape of the body or holding member of the leveling element and the application thereto of an arm to form a bevel-square and which may also be used as a T-square. Fig. 6 is an end elevation of the level and plumb with the arm applied thereto and showing the use or convenience of said arm. Fig. 7 is an end elevation of the stock, showing a gravitating sight applied thereto. Fig. 8 is a front elevation of a portion of the stock, showing the gravitating sight in edge elevation. Fig. 9 is an end elevation of the stock, showing a gravitating point or needle to coöperate with the gravitating sight disposed at the opposite end of the stock, as shown by Fig. 7. Fig. 10 is an edge elevation of the body or holding member of the leveling element, showing an angular projection in connection with the rear side thereof to adapt it to be used alone as a leveling device or small square or as an ordinary protractor.

Similar numerals of reference are employed to indicate corresponding parts in the several views.

The numeral 1 designates the stock of the combined level and plumb and which includes two members 2 and 3, arranged at right angles to each other and having strengthening-ribs 4 extending across the outer surface thereof at regular intervals. The free edges of the members 2 and 3 are formed with carefully-dressed surfaces 5 and 6 in planes at right angles to each other, said surfaces being adapted to closely bear against structure members or other objects with which they are brought into contact. Between the inner surfaces 6 the inner sides 7 of the stock or of the members 2 and 3 are left in a rough state to reduce the cost of manufacture or production of the improved device. The edges of the members 2 and 3, having the smooth surfaces 5 and 6 at right angles to each other, are slightly thickened relatively to the remaining portions of the said members in order to project the surfaces 6 with respect to the adjacent inner sides 7 of the said members to insure unretarded or unobstructed full application of the said surfaces 6 to the object or device to be tested. In the center of one end of the member 2 a sight-point 8 is located and in longitudinal alinement with a notched sight 9 at the opposite end of said member, the member 3 being similarly provided with like point 8 and sight 9 in positions reverse to the point and sight on the member 2. The member 2 also has a compass 10 applied thereto near one end for use in connection with the sighting devices just explained to adapt the stock for service as a transit in determining certain lines or levels with respect to elongated structure members or to a surface on which it may be desired to erect an inclosure of considerable length, or in running ditches or trenches, and in forming excavations. It will be understood that the stock 1, as an entirety, will be preferably formed from metal of a suitable nature and by reducing the dressing operation as much as possible or in leaving the inner sides 7 in a rough state the cost of manufacturing the device will be materially reduced.

At points intermediate of its ends the stock has outwardly-extending ears or bearing projections 11 held on the outside of the angle of intersection of the members 2 and 3 and in line with the diagonal of the two members or a line drawn centrally between the two members and which would pass through the angle of intersection of said members and through the longitudinal centers of the projections 11. The projections 11 are spaced apart from each other a suitable distance and have trunnion or fulcrum screws 12, adjustably and removably arranged in the outer free ends thereof to engage central points of the opposite sides of a holding member or body 13, which, as shown by Figs. 1 and 2, is a perfect square in contour. The holding member or body 13 is accurately balanced between the projections 11 to permit it to be turned against the outer side of either of the members 2 or 3 by manual adjustment or to automatically assume such opposite positions. The member or body 13 has a circular chamber or cavity 14 formed therein and covered by an outer dial-plate 15. Within the chamber or cavity 14 a needle or index 16 is mounted to have free movement in a circular path, and to render the operation of the said needle or index very sensitive it is provided with opposite cone-sockets 17 at the center to receive cone-pins 18, extending thereinto from the centers of the dial-plate and the back or rear side of the member or body, respectively. The one end of the needle or index is formed with a counterbalance 19, and the opposite end is constructed with a longitudinal slot 20, which will serve as a hair-line in view of the inclosure of the needle to register with the scale-marks or graduations of the dial. By counterbalancing the needle it will automatically assume an upright position when the member or body 13 is disposed perpendicularly, or if an irregularity in the level of the surface or object to which the stock is applied exists such needle will swing in either one of two directions and indicate with accuracy the degree and direction or location of such irregularity. To apply the dial with accuracy to the member or body 13 and to compensate for any slight structural deficiency that might otherwise require an expense of time and labor to rectify, slots 21 are formed at opposite points in the dial adjacent to the periphery of the latter and struck from the center of said dial, and through these slots fastening-screws 22 are inserted. It will be seen that if it is necessary to adjust the dial such operation may be readily pursued by loosening the screws 22 and afterward tightening the same. The dial has a circular scale 23, divided, as usual, to represent the degree complement of a circle, and at what may be termed the "cardinal points" or the "terminals" of intersecting diameters the dial is formed with slots or openings 24, extending across the graduated circle. The openings 24 are diamond-shaped in the dial shown by Figs. 1 and 5, and in the dial shown by Fig. 3 similarly-located openings 25 of substantial heart shape are shown, into which project inwardly-extending pointers 26, in line with inner V-shaped sight-notches 27, the form of the openings 25, together with the pointers 26 and notches 27, being preferable in many instances in view of the assistance thereof in determining when the hair-line is exactly in the center of said openings, and thereby indicate a true level, horizontal and perpendicular. At points intermediate of the openings 24 and 25 the dial-plate is formed with segmental slots 28, through which the hair-line 20 of the needle 16 will be exposed to permit a ready reading of the degrees between the cardinal points designated by the openings 24 and 25. The degrees on the dial-plate 15 are so numbered, either in single or double series, that they may be readily observed with accuracy and declinations, or irregularities may be readily determined without requiring the operator to enter into a calculation. Furthermore, the degree-marks are so numbered that a reverse movement may be had when the member or body 13 is in inverted positions. To facilitate reading of the dial when used in connection with perpendicular devices the zero-points are located adjacent to the openings at the terminals of what may be termed the "horizontal diameter," considered from the position of the dial, as shown by Figs. 1 and 3. The arrangement of the numerals on the dial as set forth is also advantageous when the stock is applied to structure members arranged in inclined positions with respect to either a horizontal or a perpendicular plane, or, in other words, when the combined device is used as an inclinometer.

The member or body 13 may be readily separated from the stock 1 and used independently of the latter for various leveling or trying operations, the square contour of said member or body adapting it to be inserted in confined spaces, either in horizontal, perpendicular, or angular positions where it would be impracticable to use the stock. The body 13 will also be preferably constructed of metal, and the dimensions thereof may be varied at will, and at times said body and needle, cooperating with the dial, may be employed for light work where leveling or truing operations are necessary.

In the modification or slightly-varied form shown by Fig. 5 the stock 1 is in all respects similar to that heretofore described; but the leveling element 29 has a portion of the edge thereof formed arcuate, as at 30, the said arcuate portion of the edge being struck from the center of the dial 31, the latter being in all respects also similar to the dial arrangement heretofore explained. Removably attached to the center of the dial 31, by means of a suitable thumb-screw 32, is the inner end of an arm 33, having an annular deflection 34 adjacent to the edge 30. This arm may be of any suitable length and converts the leveling element into a bevel-square, said arm being movable in opposite directions to coincide with the degree-marks to define any angle of bevel desired to be formed. One mode of applying the stock having the bevel-square attachment is clearly shown by Fig. 6 and wherein the arm extends over a horizontal surface. It will be understood, however, that the bevel-square attachment is not confined to this special application, but may be used in any other position. The arm 33 is also intended at times to be used in connection with the member 13, (shown by Figs. 1 and 2 as a simple T-square extension or as a bevel-square,) and therefore it is proposed to furnish this arm as a part of the complete equipment of the combined level and plumb and also the form of member shown by Fig. 5.

Fig. 10 shows a further slight modification in the form of the leveling element and consists in providing the body or member 35 with a projection or angular offset 36, adjacent to one edge on the under side to produce a simple square and leveling means. This form of the leveling attachment may also be employed as a simple protractor.

Figs. 7, 8, and 9 show a modification or slight variation in the sighting and point devices applied to the stock, and the forms of such devices which will now be described are preferred to the simplified structure heretofore explained. Each sight consists of an arched support 37, having a sight-pendulum 38 depending thereinto and free to move within the arch. The lower terminal of the pendulum is enlarged, as at 39, to weight the same, and centrally disposed in said lower terminal is a sight-opening 40, converging to a lower central sight-line 41. At the opposite end of the stock in alinement with the arch 37 is a similar arch 42, in which is disposed a pendulous needle or point 43. The advantage of this arrangement of sighting devices is that when the stock members are disposed at an angle of inclination the pendulum-sight and needle-point will always automatically assume a true perpendicular position.

It will be understood that the sighting devices illustrated in Figs. 7 and 9 are arranged in reverse position with respect to each other, as described with regard to the sighting devices illustrated in Fig. 1.

In Fig. 2 another useful attachment is shown as removably applicable to the stock and leveling element, especially when the latter are employed in transit operations. This attachment consists of a tripod or support 44, having an adjustable or telescopic rod or support 45 connected to the stock.

Aside from the use of the improved device as a level, plumb, inclinometer, bevel-square, transit, protractor, and a large and small T-square, or a large and small try-square, it will be understood that it is proposed to utilize the device for any other purpose to which it may be found applicable in determining or ascertaining levels. A material advantage arising from the structure of the stock heretofore set forth is that it can be applied to posts having either a smooth circular contour or corrugations with accuracy in determining the trueness of the perpendicular position of such posts. The stock may be also applied to horizontal curved or corrugated surfaces or to similarly-shaped structure members arranged at an angle of inclination.

Having thus fully described the invention, what is claimed as new is—

1. In a device of the class set forth, the combination of an angular stock comprising two members, and a leveling attachment pivotally connected to the stock and capable of being readily moved against the outer side of either member.

2. In a device of the class set forth, the combination of an angular stock, and a flat leveling attachment pivotally secured thereto, the leveling attachment being applicable to either of the outer sides of the stock.

3. In a device of the class set forth, the combination of an angular stock, and a leveling attachment pivotally attached thereto and having a reversely-readable scale, the leveling attachment being movable to coöperate with either of the outer sides of the stock.

4. In a device of the class set forth, the combination of an angular stock comprising two members each having straight edges at right angles to each other, and a leveling attachment pivotally mounted on the stock at the angle of intersection of the members.

5. In a device of the class set forth, the combination of an angular stock comprising two members each having straight edges at angles to each other, a portion of one of the edges of each member being projected beyond the inner surface of said member, and a leveling attachment secured to the stock.

6. In a device of the class set forth, the combination of an angular stock, a flat leveling attachment and means located at the outer angle of intersection of the sides of the stock, and engaging the leveling attachment, said leveling attachment being movable to lie against either of the outer sides of the stock.

7. In a device of the class set forth, a stock having intersecting members disposed at an angle to each other, and a leveling device movably held on the stock outside the angle of intersection of the members, said leveling attachment being adapted to be moved against the outer side of either member.

8. In a device of the class set forth, a stock having a flat leveling attachment pivotally and separably connected thereto, the leveling attachment being partly angular, and partly arcuate and having an offset portion on one of its flat sides.

9. In a device of the class set forth, a stock having members intersecting each other in planes at right angles, and a flat leveling attachment movably held at the angle of intersection of the members and adapted to be moved against the outer side of either member.

10. In a device of the class set forth, a stock comprising members intersecting each other at an angle, and automatically-movable sight devices at opposite ends of each of the members.

11. In a device of the class set forth, the combination of an angular stock comprising two members, and a flat leveling attachment pivotally and separably applied to the stock said leveling attachment being partly angular in contour.

In testimony whereof I affix my signature in presence of two witnesses.

EDWARD R. BRODTON.

Witnesses:
 JOHN L. FLETCHER,
 CHAS. S. HEPERS.